US 7,068,413 B1

(12) United States Patent
Fitzgerald et al.

(10) Patent No.: US 7,068,413 B1
(45) Date of Patent: Jun. 27, 2006

(54) NEAR-NORMAL INCIDENCE QUASI-OPTICAL REFLECTIVE FARADAY ROTATOR FOR HIGH POWER MILLIMETER WAVE RADARS

(75) Inventors: William D. Fitzgerald, Key West, FL (US); David S. Rogers, Westport, MA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 11/134,604

(22) Filed: May 18, 2005

(51) Int. Cl.
*G02F 1/09* (2006.01)
*G02B 5/30* (2006.01)
(52) U.S. Cl. ...................... 359/280; 359/486
(58) Field of Classification Search ............... 359/280, 359/281, 282, 484, 486, 487
See application file for complete search history.

(56) References Cited

U.S. PATENT DOCUMENTS

| | | | | |
|---|---|---|---|---|
| 3,164,816 A | * | 1/1965 | Gianola et al. | 365/122 |
| 3,484,152 A | * | 12/1969 | Robinson | 359/282 |
| 3,523,718 A | * | 8/1970 | Crow | 359/484 |
| 3,617,129 A | | 11/1971 | Skolnick | |
| 3,651,504 A | * | 3/1972 | Goldberg et al. | 365/122 |
| 3,697,151 A | * | 10/1972 | Skolnick et al. | 359/484 |
| 3,781,714 A | * | 12/1973 | Schlossberg | 359/484 |
| 5,115,340 A | * | 5/1992 | Tidwell | 359/484 |
| 5,978,135 A | * | 11/1999 | Abbott et al. | 359/484 |
| 6,785,037 B1 | | 8/2004 | Matsushta | |
| 6,813,076 B1 | | 11/2004 | Okubo | |

OTHER PUBLICATIONS

N.W. Harris, G.F. Dionne, J.A. Weiss and B. Lax, "Characteristics of the Quasi-Optical Reflection Circulator".
B. Lax, J.A. Weiss, N.W. Harris and G.F. Dionne, "Quasi-Optical Ferrite Reflection Circulator" IEEE Trans MIT 41, 2190 (1994).
J.A. Weiss, N.W. Harris, B. Lax and G.F. Dionne, "The Quasi-Optical Reflection Circulator; Progress In theory and Millimeter Wave Experiments" Proc. 1999 Int'l Conf. mm and sub mm Waves and Applications, SPIE, 2211, pt. 4 pp. 413-424.
W.D. Fitzgerald, "A 35 Ghz Beam Waveguide System for the Millimeter-Wave Radar", Lincoln Laboratory Journal 5, 245 (1992).

* cited by examiner

*Primary Examiner*—Ricky D. Shafer
(74) *Attorney, Agent, or Firm*—William G. Auton

(57) ABSTRACT

An optical element having characteristics suitable for use in a Faraday rotator has bonded to each of the adjacent radiation-receiving surfaces thereof with a chamber or water conducting conduit affixed therein includes a water cooled Faraday rotator element having: a base magnet plate substrate; a flowing water filled conduit fixed on the top surface of the base magnet plate substrate; a ferrite waffle iron grid with a binary top surface which reflects radiation and which has a bottom surface; and a fused copper layer fixed between the bottom surface of the ferrite waffle iron grid and the flowing water filled conduit.

1 Claim, 2 Drawing Sheets

Near Normal Incidence
Reflective Faraday Rotator

BWG System Schematic

NEAR-NORMAL INCIDENCE QUASI-OPTICAL REFLECTIVE FARADAY ROTATOR FOR HIGH POWER MILLIMETER WAVE RADARS

STATEMENT OF GOVERNMENT INTEREST

The invention described herein may be manufactured and used by or for the Government for governmental purposes without the payment of any royalty thereon.

BACKGROUND OF THE INVENTION

1. Field of the Invention

This invention relates to Faraday rotators, and more particularly to water cooled Faraday rotator element.

2. Description of the Prior Art

In the optical arts, a well-known device is a Faraday rotator which comprises a material having the characteristic that, when placed in an axial magnetic field, it exhibits a different index of refraction for circularly polarized light having a direction of propagation aligned parallel with the magnetic field than for circularly polarized light having a direction of propogation antiparallel to the magnetic field. Such devices are most commonly used in optical isolators and circulators for separating the various stages of master oscillator-power amplifier systems; separating the transmission and reception channels in systems (such as radar and line scanners) using common optical components and for isolating stable lasers from feedback and backscattered radiation which causes frequency instability in laser oscillators.

An exemplary form of an isolator using a Faraday rotor is disclosed and claimed in U.S. Pat. No. 3,617,129, filed on Nov. 10, 1969 and entitled "Interferometric Optical Isolator.", U.S. Pat. No. 6,785,037, Aug. 31, 2004 entitled Faraday rotator, Matsushita and U.S. Pat. No. 6,813,076, Nov. 2, 2004 entitled Faraday rotator, optical isolator, polarizer, and diamond-like carbon thin film, issued to Okubo. The systems disclosed therein, are incorporated herein by reference.

Higher power tubes—gyro TWT's and gyro klystrons—can generate average power levels of many 10's kilowatts and possibly 100 kw or better at millimeter wave frequencies. Proposed radars which use these tubes must necessarily use beam waveguide (BWG) or quasi-optical techniques. Unfortunately, the transmission type Faraday rotators which have been used with se BWG radars at lower power levels cannot accommodate more than a few kilowatts. A new design is required, and the present invention is intended to satisfy that need.

Higher power tubes—gyro TWT's and byro klystrons—can generate average power levels of many 10's of kilowatts and possibly 100 kw or better at millimeter wave frequencies. Proposed radars which use these tubes must necessarily use beam waveguide (BWG) or quasi-optical techniques. Unfortunately, the transmission type Faraday rotators which have been used with se BWG radars at lower power levels cannot accommodate more than a few kilowatts. A new design is required.

A Lincoln Laboratory group (Ref. 1 through 4) proposed a reflective F.R. in which the back surface of the ferrite disk is metalized. The incident beam is reflected into a 90° turn (the angle of incidence with the ferrite disk $\theta_i=45°$) and the metalized surface is water cooled. Expected power levels are perhaps two orders of magnitude greater than the transmission type F.R. Unfortunately, matching requirements for $\theta_i=45°$ differ substantially for the two orthogonal polarizations i.e. the s and p polarizations. This distorts the electrical performance of the device. The polarization rotation fluctuates and cross-polarization components are introduced to the output signal. A single quarter wave matching plate performs poorly. Dual matching plates, which are difficult to implement (and cool) theoretically improve performance, but not to the level of the transmission type device.

We describe here a near normal incidence ($\theta_i<10°$) reflective F.R. for which the distinctions between the s and p polarizations vanish as well as the associated distortions. The design combines the advantages of the transmission and $\theta_i=45°$ reflective F.R.'s and avoids their disadvantages. How do we achieve near normal incidence without interference? It's done with mirrors. Really!

SUMMARY OF THE INVENTION

According to the present invention, an optical element having characteristics suitable for use in a Faraday rotator has bonded to each of the adjacent radiation-receiving surfaces thereof with a chamber or water conducting conduit affixed therein. More specifically, one embodiment of the invention includes a water cooled Faraday rotator element having: a base magnet plate substrate; a ferrite disk with a "waffle iron" grid cut into the top surface which matches the incident radiation from air into the ferrite medium, and a bottom surface with a reflecting copper layer which also provides for the water cooling.

The foregoing and other objects, features, and advantages of the present invention will become more apparent in the light of the following detailed description of a preferred embodiment thereof, as illustrated in the accompanying drawing.

DESCRIPTION OF THE PREFERRED EMBODIMENT

Figure 1:
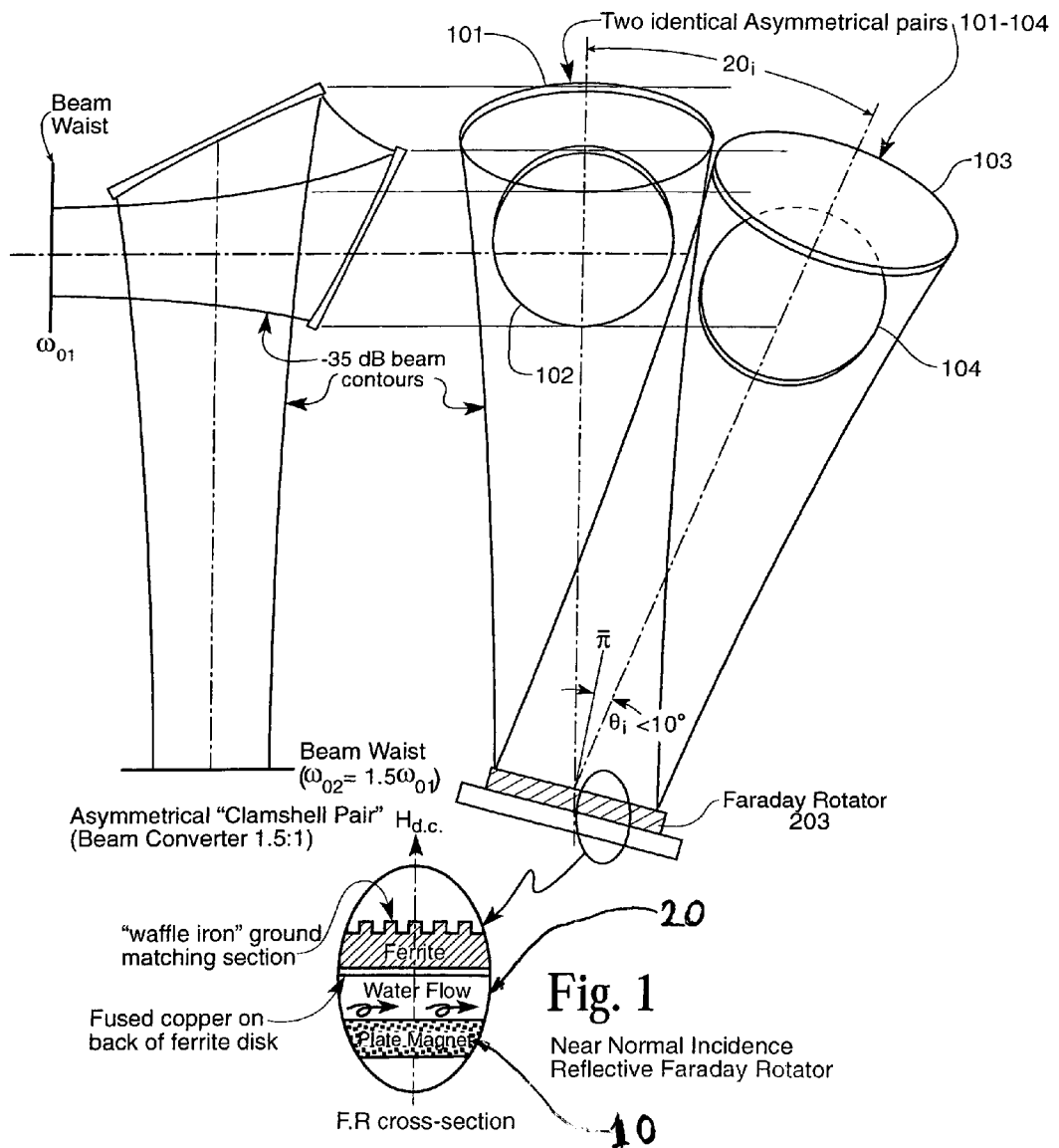
FIG. 1: Herein comprises a simplified, partially sectioned perspective view of a water cooled Faraday rotator element in accordance with the present invention.

The present invention uses a water cooled Faraday rotator element. More specifically, one embodiment of the invention, as shown in FIG. 1, includes a water cooled Faraday rotator element having: a base magnet plate substrate 10; a flowing water filled conduit 20 fixed on the top surface of the base magnet plate substrate; a ferrite waffle iron grid 30 with a binary top surface which matches the incident radiation and which has a bottom surface; and a fused copper layer 40 fixed between the bottom surface of the ferrite waffle iron grid and the flowing water filled conduit.

Table 1 provides a listing of special abbreviations used in the description of this invention.

TABLE 1

| # | Item | Definitions |
|---|---|---|
| 1 | TWT | Traveling Wave Tube |
| 2 | FR | Faraday Rotator |
| 3 | TEM | Transverse Electromagnetic Modes |
| 4 | HUSIR | Haystack Ultra-Wideband Satellite Imaging Radar |
| 5 | WARLOC | W-Band Advanced Radar For Low Observable Control |
| 6 | HAZ FR | Haystack Auxiliary Radar Faraday Rotator |

TABLE 1-continued

| # | Item | Definitions |
|---|------|-------------|
| 7 | WARLOC FR | W-Band Advanced Radar For Low Observable Control Faraday Rotator |
| 8 | HAX | Haystack Auxiliary Radar |
| 9 | MMW | Millimeter Wave Radar |

CONFIGURATION

FIGS. (1) and (2) show the reflector configuration. Two "clamshell" pairs are oriented at an angle $2\theta_i$, sufficient to avoid interference between input and output beams. The Faraday rotator is placed at the beam waist as shown with a diameter of $4\omega_{02}$, which embraces all of the Gaussian beam down the −35 dB level (the contours shown in FIG. 1). Cancellation of the higher order mode is incomplete. A beam conversion of 2:1 (Ref. 4.) yields a cross-polarized level of −31.5 dB. The 1.5:1 converter (the example shown in FIG. 1.) has $TEM_{01}$ mode level of approximately −35 dB, which is totally negligible. For example, the system beamwaist (that which efficiently illuminates the Cassegrain system) for HUSIR and WARLOC is $\omega_{01} = 0.42$[11]. The minimum $\theta_{i\ without}$ interference between input and output reflectors is proportional to $\lambda/\omega_{02}$ and is as follows:

TABLE 2

| Beam Waist | Conversion Factor | $\theta_I$ Min | Ferrite Diameter |
|---|---|---|---|
| $\omega_{02} = 0.42"$ | 1:1 | 15° | 1.6" |
| = 0.63" | 1.5:1 | 10° | 2.4" |
| = 0.84" | 2:1 | 75° | 3.2" |

Hence, a conversion factor of 2:1, reduces the power density by a factor of four quadruples the power handling capability (assuming adequate cooling). The angle of incidence $\theta_1$, can be reduced by a factor of 0.75 by truncating one edge of the beam to the 20 dB level. This represents a loss of about 0.01 dB.

Figure 2:
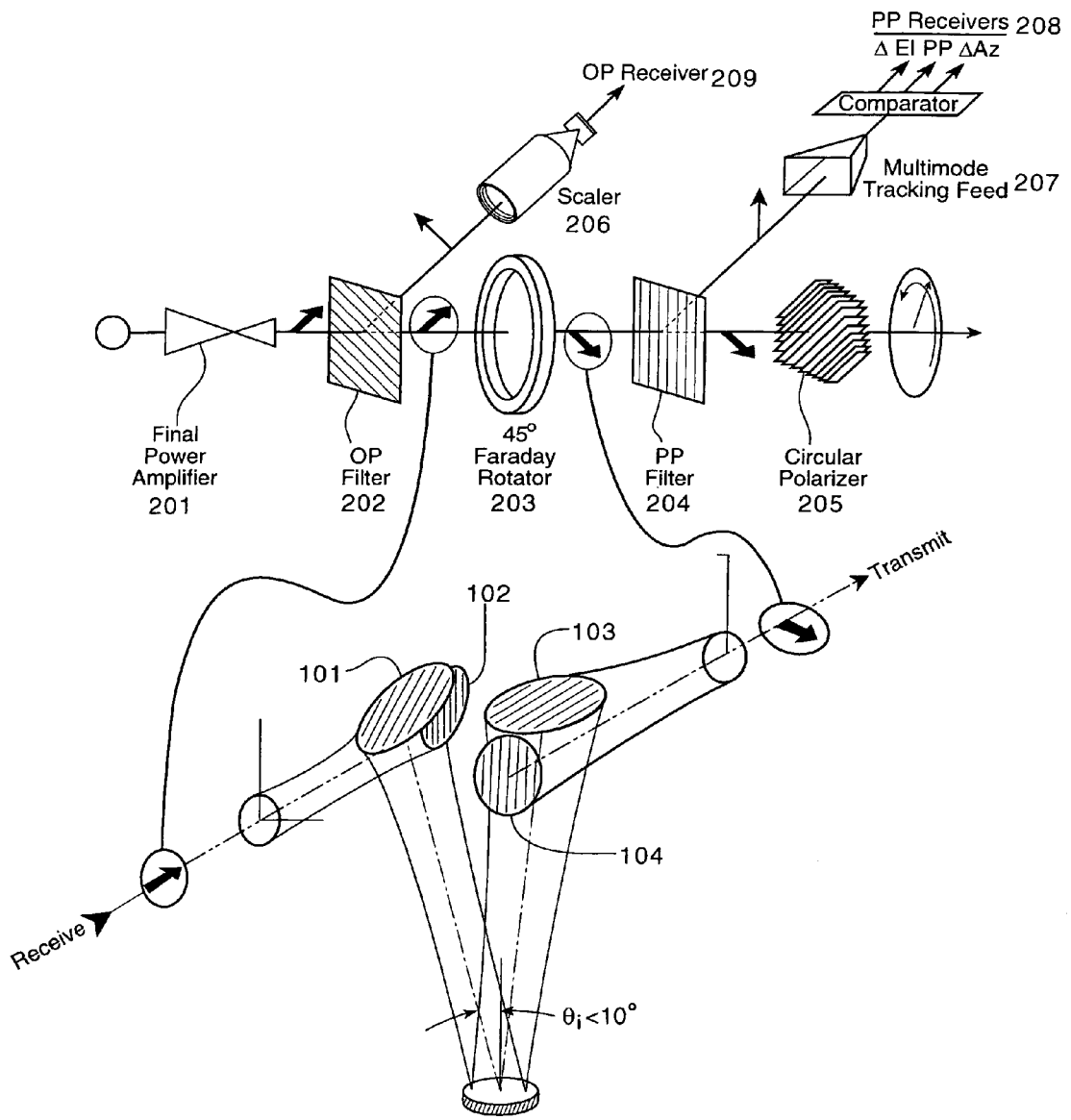
FIG. 2: Shows a system using the Faraday rotator of the present invention.

The present invention is a near-normal reflective Faraday rotator. FIG. 1 shows a partially sectioned perspective of a Faraday rotator element that uses two clamshell reflector pairs 101, 102, 103, and 104. FIG. 2 shows the use of the system of FIG. 1 incorporated into a BWG System that includes: a final power amplifier 201, an optical filter 202, the Faraday rotator 203, a filter 204, a circular polarizer 205, a sealer 206, a multimode tracking feed 207 and receivers 208 and 209. The four clamshell reflector elements 101–104 receive a signal (receive) and output an optical signal labeled "transmit".

A cross-section of the Faraday rotator is also shown in the FIG. 1. The quarter wave matching surface is a "waffle iron" pattern cut into the ferrite disk. It was pioneered with the HAX F.R. and perfected with WARLOC. It works well. The fused copper layer on the back side of the ferrite disk need be only a few skindepths thick. The WARLOC F.R. had power problems with a diamond disk bonded to the ferrite. Differential thermal forces with a whisker thin copper mirror wouldn't fracture a cigar ash. Note that the rf. power "sees" nothing but ferrite material and a water cooled copper mirror.

Table 1 summarizes the characteristics of the three quasi-optical F.R.'s. We have built F.R.'s for the HAX (16 Ghz), the MMW (35 Ghz) and the WARLOC (95 Ghz) radars. All of which have excellent electrical characteristics, low-loss, low distortion, etc. The highest ave. power demonstrated is 10 kw with the HAX unit. Power handling diminishes with increasing frequency. It seems a hopeless quest to find a transmission type design at the high MMW frequencies which will handle 10's of kw.

Another problem with the transmission design is that some of the reflected power finds its way into the $\Sigma$op receiver, (see FIG. 2) requiring lossy and expensive receiver protectors. This problem disappears completely with the reflective F.R.'s.

Ordinary aluminum tubing can be used for the water conduit with a variety of commercially available water pumps to provide cooling as needed.

While the invention has been described in its presently preferred embodiment it is understood that the words which have been used are words of description rather than words of limitation and that changes within the purview of the appended claims may be made without departing from the scope and spirit of the invention in its broader aspects.

A reflective Faraday rotator with a near normal angle of incidence has the following advantages:
 very high power handling capability
 well matched with a machined "waffle iron" surface layer
 Broadband polarization rotation with total isolation between high power and receiver channels.

What is claimed is:

1. A water cooled Faraday rotator element comprising:
 a base magnet plate substrate having a top surface;
 a flowing water filled conduit fixed on the top surface of the base magnet plate substrate;
 a ferrite waffle iron grid with a binary top surface which matches radiation and which has a bottom surface; and
 a fused copper layer fixed between the bottom surface of the ferrite waffle iron grid and the flowing water filled conduit.

* * * * *